United States Patent
Sakaguchi

(10) Patent No.: US 7,139,085 B1
(45) Date of Patent: Nov. 21, 2006

(54) MANAGEMENT APPARATUS OF PRINTER

(75) Inventor: Eiji Sakaguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/422,564

(22) Filed: Oct. 21, 1999

(30) Foreign Application Priority Data

Oct. 23, 1998 (JP) ............... 10-302207

(51) Int. Cl.
- *G06F 3/12* (2006.01)
- *G06F 15/00* (2006.01)
- *G06F 1/00* (2006.01)

(52) U.S. Cl. .................. 358/1.15; 358/1.13
(58) Field of Classification Search ........ 358/1.1–1.18
See application file for complete search history.

(56) References Cited

U.S. PATENT DOCUMENTS

| | | | | |
|---|---|---|---|---|
| 5,371,837 A | * | 12/1994 | Kimber et al. | 358/1.15 |
| 5,580,177 A | * | 12/1996 | Gase et al. | 400/61 |
| 5,689,755 A | * | 11/1997 | Ataka | 399/8 |
| 5,727,135 A | * | 3/1998 | Webb et al. | 358/1.14 |
| 5,978,559 A | * | 11/1999 | Quinion | 358/1.15 |
| 6,058,277 A | * | 5/2000 | Streefkerk et al. | 399/81 |
| 6,075,615 A | * | 6/2000 | Nakamura | 358/1.14 |
| 6,088,120 A | * | 7/2000 | Shibusawa et al. | 358/1.15 |
| 6,130,757 A | * | 10/2000 | Yoshida et al. | 358/1.15 |
| 6,344,859 B1 | * | 2/2002 | Alimpich et al. | 345/762 |
| 6,348,971 B1 | * | 2/2002 | Owa et al. | 358/1.15 |
| 6,552,813 B1 | * | 4/2003 | Yacoub | 358/1.1 |
| 6,888,641 B1 | * | 5/2005 | Koana | 358/1.15 |
| 6,940,615 B1 | * | 9/2005 | Shima | 358/1.15 |

FOREIGN PATENT DOCUMENTS

JP          9-319532          12/1997

* cited by examiner

*Primary Examiner*—Douglas Q. Tran
(74) *Attorney, Agent, or Firm*—Fitzpatrick, Cella, Harper & Scinto

(57) ABSTRACT

A list of plural printers, which are connected to a network, is displayed on a display of a personal computer. An operator selects desired printers as a printer group, of which name is given for a registration. Processing performance of the registered printer group is displayed on the display. The registered printer group can be treated as like an individual printer. In addition, when print jobs of the plural numbers of prints are instructed to the printer group, a job is distributed to each of the printers in the printer group. A job progressing situation of each printer is displayed for an user.

12 Claims, 4 Drawing Sheets

MANAGEMENT APPARATUS OF PRINTER

BACKGROUND OF THE INVENTION

1. Field of the Invention

The present invention relates to management of plural printers connected to a network.

2. Related Background Art

In a printer system which commonly has plural printers connected a network, in case of assigning an output destination, it is considered that an operating situation of the printer is displayed to an user, who selects the output destination in accordance with the necessity. For example, such cases as selecting a printer in normal operating and ready to use, a printer capable of color outputting, a printer capable of high speed printing, a printer capable of two-face printing and the like are considered.

Further, printing speed can be improved by performing a printing operation simultaneously upon assigning the plural printers as output destinations.

However, in order to assign the plural printers as the output destinations, although the plural printers which are individual have to be assigned, it is required to obtain information of the operating situation and processing performance of each printer individually and an user has to total up the obtained information. As a result, it takes time.

Also, since a setting operation has to be performed again by separating one job into plural jobs, the operation becomes complex.

For the user, in order to recognize progressing situation of jobs being outputted to the plural output destinations, it is required to obtain information of the progressing situation of each printer individually and the user has to total up the obtained information. As a result, it takes time.

In case of setting the plural output destinations, the user has to judge whether or not each printer assigned as the output destination has performance of executing the setting contents of an output. As a result, it takes time.

Therefore, as described in Japanese Patent Application (Laid-Open) No. 9-319532, the plural printers are to be realized as a group which is treated as one logical printer. Printing jobs of plural prints are automatically distributed to each of the printers which structure the logical printer.

However, in the above-described conventional art, since performance of the logical printer is not concretely indicated to the user, the user has to judge the performance of the logical printer by grasping the performance of each of the printers which structure the logical computer. As a result, it takes time in selecting the printer.

SUMMARY OF THE INVENTION

An object of the present invention is to provide a management apparatus of a printer and a management method for eliminating the above-described problems.

Another object of the present invention is to provide the management apparatus of the printer and the management method for enabling to select an optimum printer desired by the user by automatically totaling up total operating situation and processing performance of the logical printer and progressing situation of jobs, and indicating thus information to the user.

Other objects of the present invention will become apparent from the following description based on the attached drawings and the appended claims.

DETAILED DESCRIPTION OF THE PREFERRED EMBODIMENT

An embodiment of the present invention will be described with reference to the attached drawings.

Figure 1:
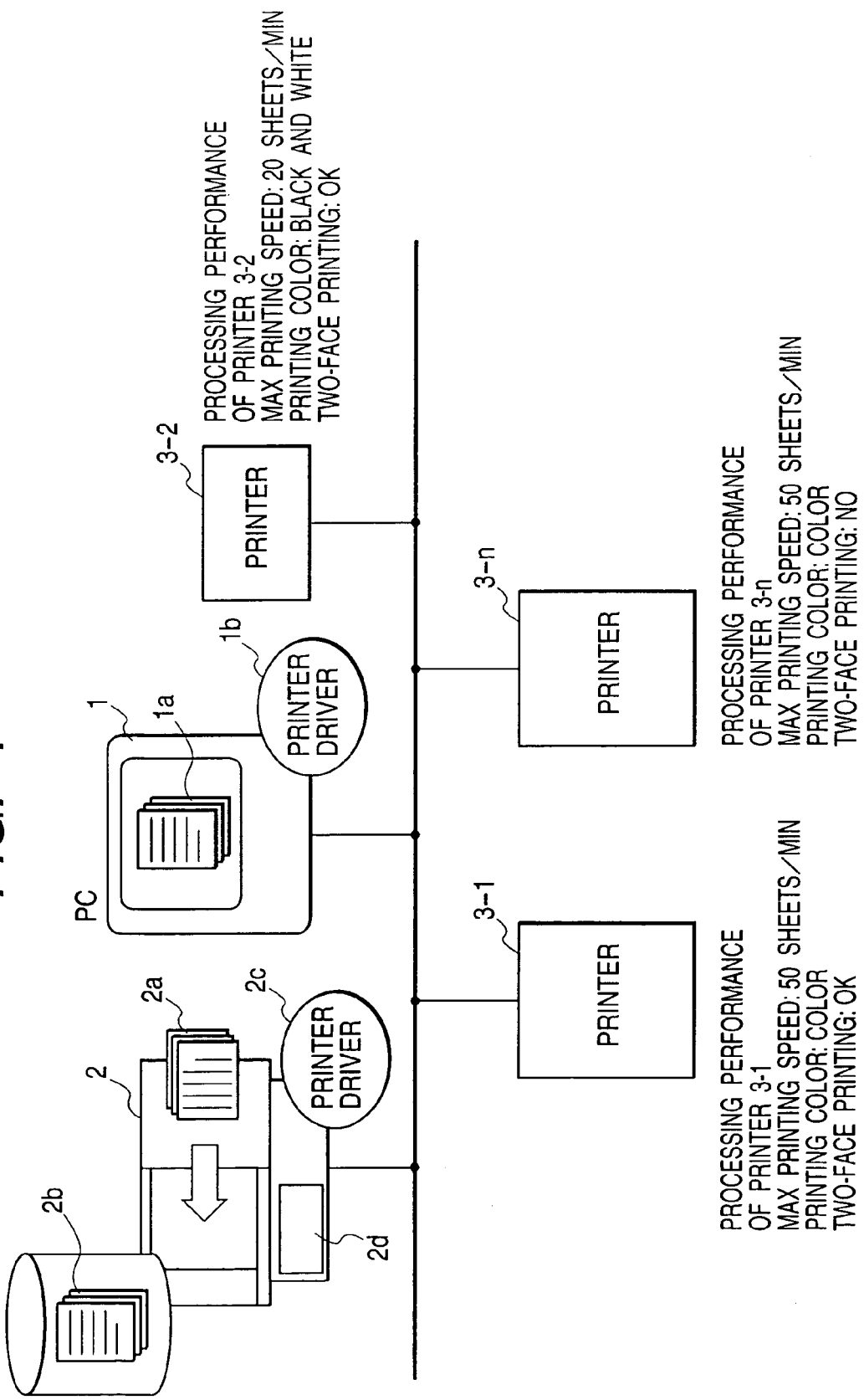
FIG. 1 is a conceptional view showing a printer system which can be applied to the present invention.

FIG. 1 is a conceptional view showing a printer system which can be applied to the present invention. Numeral 1 denotes a personal computer (PC). Various application softwares running on the PC 1 create data 1a to be outputted to a printer. Numeral 1b denotes a printer driver. The printer driver 1b operating on the PC 1 requests to output the data 1a for an optional printer, which is assigned with the printer driver 1b by an user, among plural printers 3-1 to 3-n connected through a network line, manages the printers-connected through the network line, gives an output instruction to the printers and obtains information from the printers. Further, the printer driver 1b has a management function which previously registers an optional combination of the plural printers connected through the network line as a printer group and manages the printer group.

Numeral 2 denotes a scanner, which reads images on an original 2a, has an image memory 2b such as a hard disk or the like, keys for performing various setting and a console section 2d having a display. Numeral 2c denotes a printer diver which has the same function as that of the printer driver 1b.

Setting of the printer drivers 1b and 2c is performed from the PC 1.

Processing performance of the printer 3-1 is specified that a maximum printing speed is 50 sheets/min., printable color is in full color and a two-face printing function is equipped. Processing performance of the printer 3-2 is specified that the maximum printing speed is 20 sheets/min., the printable color is in black/white and the two-face printing function is equipped. Processing performance of the printer 3-n is specified that the maximum printing speed is 50 sheets/min., the printable color is in full color and the two-face printing function is not equipped.

In respect of the function, it is not limited to the above-described function but may be another function such as, for example, a stapling function or the like.

Figure 2:
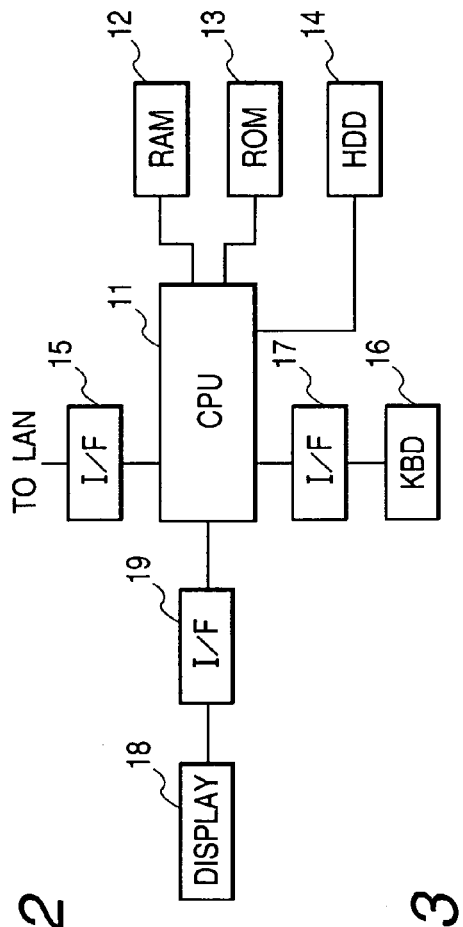
FIG. 2 is a block diagram showing an outline of the structure of a personal computer.

FIG. 2 is a block diagram showing an outline of the structure of the PC 1. Numeral 11 denotes a CPU which controls an entire operation. Numeral 12 denotes a RAM which stores data and functions as a work area of the CPU. Numeral 13 denotes a ROM in which a control program and various data are stored. Numeral 14 denotes a hard disk (HDD) which stores data, and in which an application software program and various driver programs are stored. Numeral 15 denotes an interface (I/F) used in connecting the CPU with a LAN. Numeral 16 denotes a keyboard which is used by an operator to input instructions and data. Numeral 17 denotes a keyboard interface. Numeral 18 denotes a display which displays various data and an operation screen. Numeral 19 denotes a display interface.

Data representing the processing performance of each printer is held in each printer itself and is transmitted to the PC 1 through the network to be stored in the HDD 14.

Figure 3:
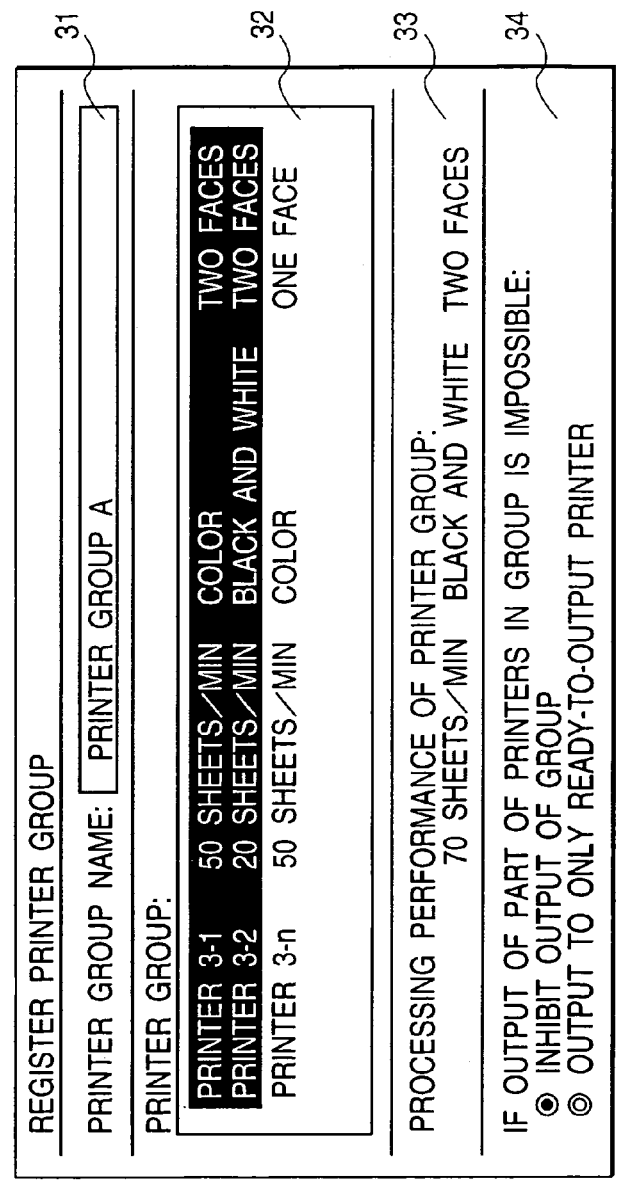
FIG. 3 is a view showing a screen used in registering a printer group.

FIG. 3 shows a dialogue screen used in registering a printer group (logical printer) and is displayed on the display 18 of the PC 1 by inputting a group registering instruction from the keyboard 16.

In a column 31 corresponding to "printer-group name", an optional printer group name is inputted from the keyboard 16 by the user. In an example screen shown in FIG. 3, "printer group A" is inputted. Hereafter, this printer group is called as "printer group A".

In a column 32 corresponding to "printer group", the printers connected through the network line and processing performance thereof are displayed as a list. The operator selects the desired plural printers as the printer group from the displayed list with the keyboard 16. Displaying items in the column 32 are printer names and processing performance. In an example shown in FIG. 3, as the processing performance, a maximum printing speed per minute (50 sheets/min., 20 sheets/min., etc), printable color (color, black/white, etc.), a two-face printing performance (two faces, one faces) and the like are specified. As described above, as to information of the printer name and the processing performance, it is considered that the printer driver 1b obtains the information by communicating with each printer or the user performs the setting using another dialogue screen of the printer driver 1b. However, detailed description will be omitted here. In the example shown in FIG. 3, as the printers structuring the "printer group A", the printers 3-1 and 3-2 are selected and displayed with negative color.

A column 33 corresponding to "processing performance of printer group" represents total processing performance of the "printer group A". In this example, the performance is specified that the maximum printing speed is 70 sheets/min., the printable color is in black/white and the two-face printing performance (function) is equipped. Among the processing performance, the maximum printing speed is indicated by the sum of the maximum printing speed of each of the printers, which structure the printer group, while as to other processing performance, only the function which can be commonly processed in all the printers, which structure the printer group, is displayed. If refer to the example shown in FIG. 3, since the maximum printing speed of the printer 3-1 is 50 sheets/min. and the maximum printing speed of the printer 3-2 is 20 sheets/min., a total maximum printing speed of the "printer group A" reaches 70 sheets/min. being the sum of the above both speed. That is, in appearance, it becomes possible to treat the "printer group A" as a high speed printer. As to the processing performance other than the maximum printing speed, only the common function is valid. For example, the printer 3-1 is a color printer which can performs both a color printing and a black/white printing. However, the printer 3-2 is a monochrome printer which can only performs the black/white printing. Therefore, as the "printer group A", the printing color which can be processed is only the black/white printable for both the printer 3-1 and the printer 3-2. Since both the printer 3-1 and the printer 3-2 can perform the two-face printing, as the "printer group A", the two-face printing can be processed.

By displaying the "processing performance of printer group", the user, in case of performing the printing by assigning the printer group to be registered, can easily recognize what kind of processing performance the assigned printer group has.

In a column 34 corresponding to "if output of part of printers in group is impossible", it is selected with the keyboard 16 to inhibit an output as the printer group or to output to only the printer which is possible to output, in a case where a part of the plural printers, which structure the printer group, is impossible to output because of error or in a case where a part of the printers is impossible to output because of not having the function desired by the user (for example, an user desires the two-face printing, but a part of printers does not have function of two-face printing). That is, the "inhibit output of group" and the "output to only ready-to-output printer" are alternative, i.e., in exclusive relation. In the example shown in FIG. 3, the "inhibit output of group" is selected.

Figure 4:
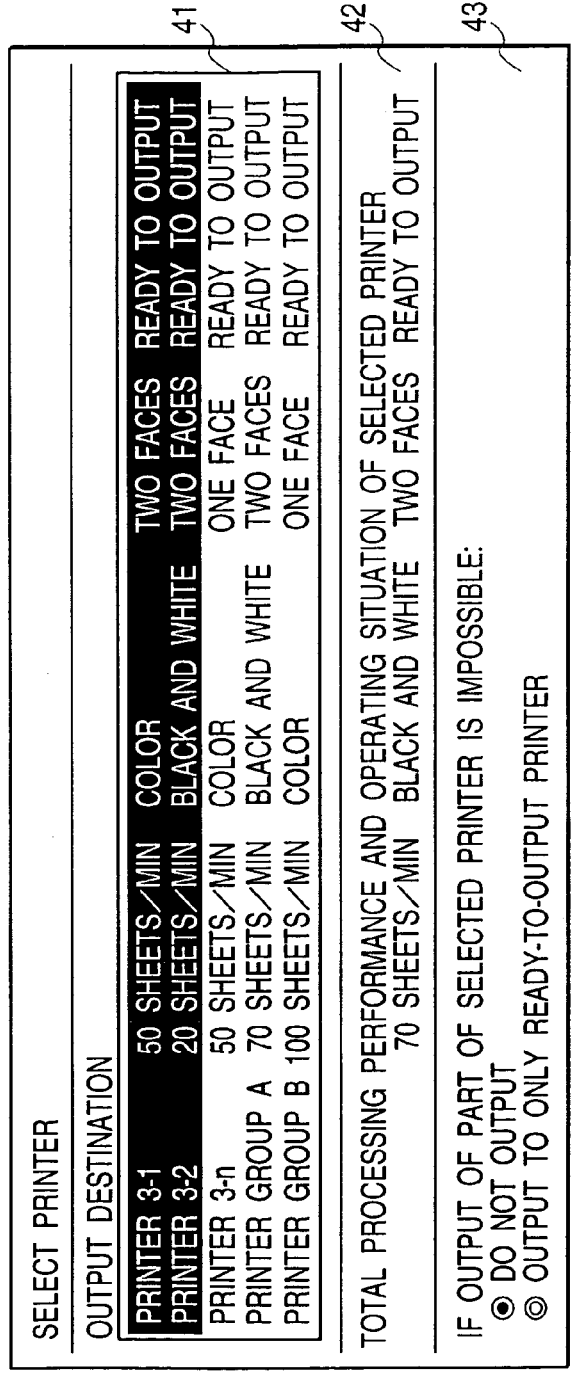
FIG. 4 is a view showing a screen used in selecting a printer being an output destination.

FIG. 4 is a dialogue screen which is used in selecting the printer being an output destination and is displayed on the display 18 of the PC 1.

A column 41 corresponding to "output destination" indicates a list of the plural selectable printers. In the column, the individual printers connected through the network line and the printer groups registered in the screen shown in FIG. 3 are displayed as a list. The operator selects the individual printers, the printer groups or various combinations of them with the keyboard 16. In this time, if the plural individual printers or the printer group is selected, the printers structuring the printer group are assigned as the output destinations. As displaying items of the list, as to the individual printers, a printer name, processing performance, operating situation and the like are displayed. The operating situation of the individual printers means that the output is possible (ready to output) or the output is impossible (not ready to output). The displaying items of the printer groups are a printer group name, processing performance of the printer group, operating situation of the printer group and the like. As to the printer group name and the processing performance of the printer group, the contents as explained in FIG. 3 are displayed. As the operating situation of the printer group, if outputs of all the printers, which structure the group, are possible, "ready to output" is displayed, and if the outputs of all the printers are impossible, "not ready to output" is displayed. In a case where an output of a part of the printers, which structure the group, is impossible, on the basis of a setting of "if output of part of printers in group is impossible" explained in FIG. 3, if the setting is "inhibit output of group", "not ready to output" is displayed, and if the setting is "output to only ready-to-output printer", "ready to output" is displayed. The operating situation of the printers is recognized by performing the communication between the printer driver 1b and each printer.

A column 42 corresponding to "total processing performance and operating situation of selected printer" displays the total performance and the operating situation of each printer selected as the output destination. Among the processing performance, the maximum printing speed is indicated by the sum of the maximum printing speed of the printers ready to output among each of the printers selected as the output destinations. As other processing performance, only the function which can be commonly processed by the printer ready to output is displayed among each of the printers selected as the output destinations. In a position of the operating situation, if the all the printers selected as the output destinations are possible to output, "ready to output"

is displayed, while if all the printers are impossible to output, "not ready to output" is displayed. In a case that a part of the printers is impossible to output, on the basis of a setting in a column 43 corresponding to "if output of part of selected printer is impossible" displayed on the same dialogue screen, if the setting is "do not output", it is determined that the output is impossible, and if the setting is the "output to only ready-to-output printer", it is determined that the output is possible. The "do not output" and "output to only ready-to-output printer" are in exclusive relation. If the setting is the "do not output", the printer driver 1b does not request to output for the printers in a case that a part of the printers selected as the output destinations is impossible to output. If the setting is the "output to only ready-to-output printer", the printer driver 1b requests to output for the printer ready to output.

Figure 5:
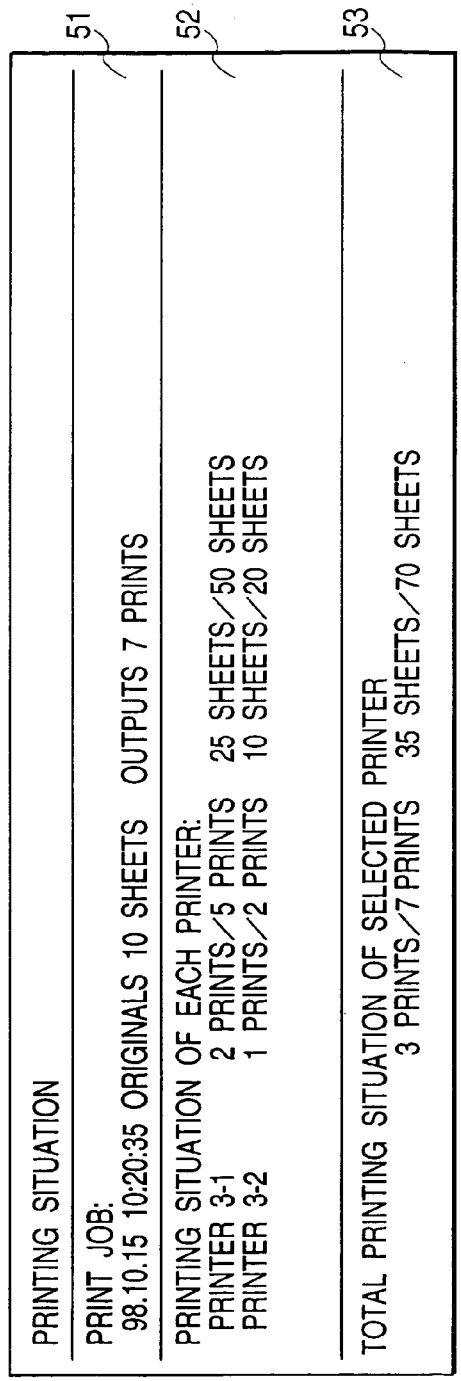
FIG. 5 is a view showing a screen for displaying progressing situation and a result of a print job.

FIG. 5 shows a dialogue screen which displays a progressing situation and a result of a print job and is displayed on the operation section (display) 18 of the PC 1.

When an user assigns the output destination by the printer selection dialogue shown in FIG. 4, and the print execution is started upon assigning output number of prints in the data 1a by the PC 1, the printer driver 1b outputs a print request by distributing the assigned number of prints to the assigned each printer so as to manage the print request as one print job. In a printing situation dialogue screen, a progressing situation and a result of the one print job are displayed.

In a column 51 corresponding to "print job", date and time of starting the print execution (in FIG. 5, "98.10.15 10:20:35"), the number of pages in the data 1a (in FIG. 5, "originals 10 sheets") and the number of output prints assigned by the user (in FIG. 5, "output 7 prints") are displayed to help the user in specifying the print job.

In a column 52 corresponding to "printing situation of each printer", outputting situation of each printer being the output destination are displayed as a list. Displaying items in the list are the printer name (in FIG. 5, "printer 3-1"), the number of outputted prints (in FIG. 5, "2 prints" in a display of "2 prints/5 prints), the number of output prints requested to the printer (in FIG. 5, "5 prints" in a display of "2 prints/5 prints"), the number of outputted sheets (in FIG. 5, "25 sheets" in a display of "25 sheets/50 sheets") and the number of output sheets requested to the printer (in FIG. 5, "50 sheets" in a display of "25 sheets/50 sheets").

In a column 53 corresponding to "total printing situation of selected printer", total outputting (printing) situation is displayed as the print job. Displaying items are the sum of the number of outputted prints at each printer (in FIG. 5, "3 prints." in a display of "3 prints/7 prints"), the number of output prints assigned by the user (in FIG. 5, "7 prints" in a display of "3 prints/7 prints"), the sum of the number of outputted sheets at each printer (in FIG. 5, "35 sheets" in a display of "35 sheets/70 sheets) and the product obtained by multiplying the number of output prints assigned by the user by the number of pages in the data 1a (in FIG. 5, "70 sheets" in a display of "35 sheets/70 sheets").

The print job is distributed under the condition that the time required for the total print job is to become the shortest time on the basis of performance of each of the selected printers (mainly, printing speed) and the number of output prints of the print job. That is, the number of prints are distributed to each printer with the ratio of the printing speed of each printer. When the two-face printing is performed, by setting information of the printing speed of each printer in executing the two-face printing to the PC 1, the job is distributed on the basis of the information of the two-face printing speed.

In the above-described embodiment, a case of outputting the print job from the PC 1 is described. However, a case of outputting image data, which is scanned by a scanner provided with an user interface and a printer driver or an apparatus unitedly composed of the scanner and a printer (for example, copying machine, FAX or the like), to the plural printers is also can be adapted.

Next, an example of outputting the image data, which is scanned by the scanner provided with the user interface and the printer driver, to the plural printers will be explained.

Data 2b to be outputted to the printer is created by scanning an original 2a using a scanner 2 shown in FIG. 1. A printer driver 2c has the same function as that of the printer driver 1b. Scanning of the original 2a and operating of the printer driver 2c are performed using the console section 2d of the scanner. The printer driver 2c operating on the scanner 2 requests to output the data 2b to an optional printer, which is assigned by the user with the printer driver 2c among the plural printers 3-1 to 3-n connected through the network line.

It should be noted that a function of the driver 2c and a screen displayed on the console section 2d of the scanner 2 are equivalent to the screen displayed on the operation section 18 of the PC 1.

Figure 6:
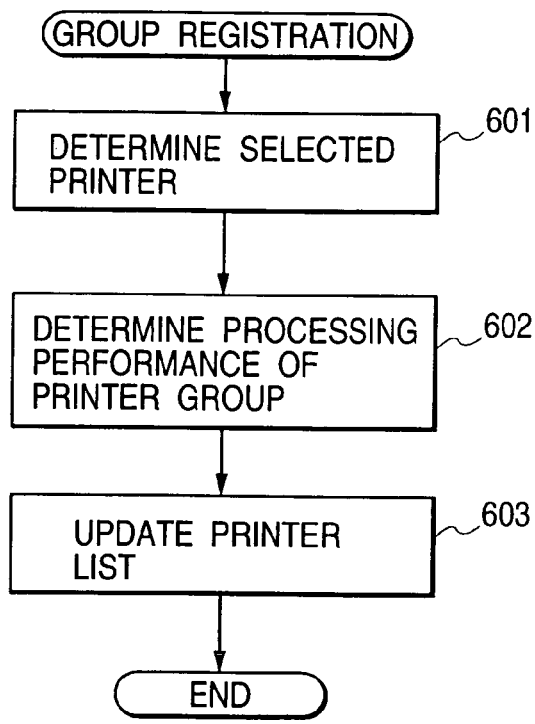
FIG. 6 is a flow chart showing a registration process of the printer group.

FIG. 6 is a flow chart showing a registration process of the above-described printer group.

First, when a registration of the printer group is instructed, the plural printers assigned by the user is determined (step 601) and the processing performance of the printer group is determined on the basis of the processing performance of the each assigned printer (step 602). Then, a printer list is updated so as to display the printer group which is registered in the printer list when the printing is executed (step 603).

Figure 7:
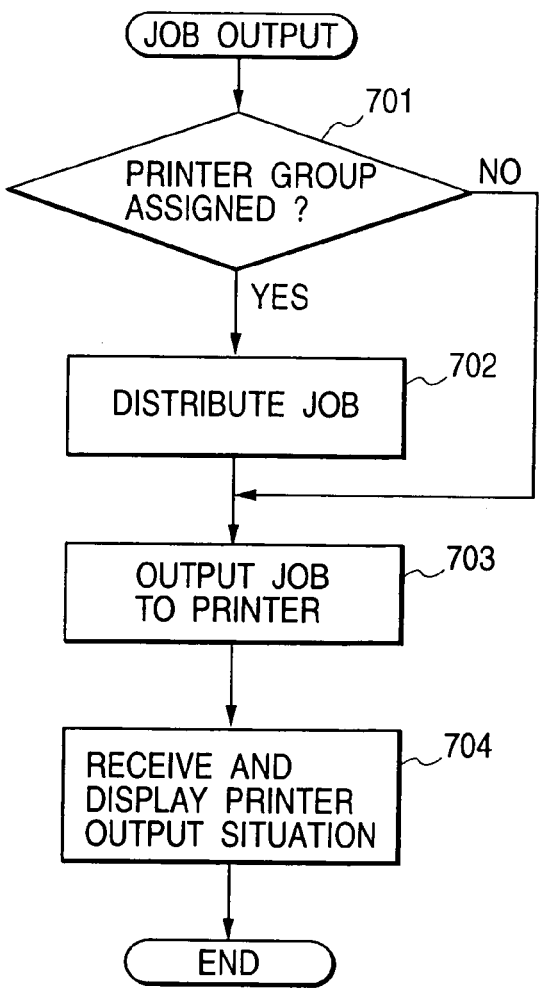
FIG. 7 is a flow chart showing a job outputting process when a printing instruction is received.

FIG. 7 is a flow chart showing a job outputting process when a printing instruction is received.

First, when the printing instruction is received, it is judged if the selected printer is the individual printer or the printer group (step 701). If the printer group is assigned, the job is distributed to each printer in the assigned printer group (step 702) and the job is outputted to each printer (step 703). If the individual printer is assigned, the job is outputted to the printer, and job outputting situation of the printer is received and displayed (step 704).

It is needless to say that an object of the present invention also can be attained to supply a recording medium which stores a program code of software for realizing the function in the above-described embodiment to a system or an apparatus to be read out and executed the program code by the system or a computer (or CPU or MPU) provided in the apparatus.

In this case, the program code itself read out from the recording medium is to realize a new function of the present invention and the recording medium which stores the program code is to construct the present invention.

As the recording medium for supplying the program code, e.g., a floppy disk, a hard disk, an optical disk, a magnetooptical disk, a CD-ROM, a CD-R, a magnetic tape, a non-volatile memory card, a ROM, an EEPROM or the like can be used.

It is needless to say that not only the function of the above-described embodiment can be realized but an OS (operating system) or the like operating on the computer executes a part or all of the actual process which can realize the function of the above-described embodiment by executing the program code read out by the computer.

Further, it is needless to say that the program code read out from the recording medium is written in a memory which is provided in a function expansion board inserted in the computer or the function expansion unit connected to the computer, thereafter, on the basis of an instruction of the program code, a CPU or the like provided in the function expansion board or the function expansion unit executes a part or all of the actual process which can realize the function of the above-described embodiment.

The present invention may be applied to a system structured by a plurality of apparatuses or to an apparatus structured by one device. It is needless to say that the present invention can be adapted to the case of attaining an object by supplying a program to a system or an apparatus. In this case, a recording medium which stores a program expressed by a software for attaining the present invention is read out on the system or the apparatus, thereby, it becomes possible that the system or the apparatus obtains an effect of the present invention.

Further, the program expressed by the software for attaining the present invention is read out from a data base on a network by down loading by using a communication program, thereby, it becomes possible that the system or the apparatus obtains an effect of the present invention.

The present invention can be modified in various manner, within the scope of the following claims.

What is claimed is:

1. A management method for a personal computer which manages a printing operation in which plural printers are used as print output destinations, said method comprising:
    a distribution step of dividing one print job into a plurality of distribution print jobs and distributing the plurality of distribution print jobs, via a virtual printer which is related with the plural printers, to the plural printers in response to input of a print start instruction by a user;
    a first display control step of causing a display unit to display a situation of each of the distribution print jobs of the plural printers, the situation of each distribution print job indicating how much of the distribution print job has been printed; and
    a second display control step of causing the display unit to display a comprehensive job situation of the one print job, based on situations of the distribution print jobs of the plural printers used as the print output destinations, the comprehensive job situation indicating how much of the one print job has been printed.

2. A management method according to claim 1, wherein said second display control step includes causing the display unit to display the comprehensive job situation and the situations of the distribution print jobs of the plural printers so that the situations of the print jobs of the plural printers correspond to the comprehensive job situation.

3. A management method according to claim 1, further comprising an acquisition step of acquiring information including progress situations of the job from the plural printers through a communication line, and
    wherein said second display control step includes causing the display unit to display the comprehensive job situation of the one print job, based on the progress situation of each of the jobs acquired in said acquisition step.

4. A management method according to claim 1, further comprising:
    a registering step of registering plural printers selected by an operator as one virtual printer; and
    a display step of displaying the plural printers and the virtual printer as printers to be selected when printing is to be executed.

5. An information processing apparatus for managing a printing operation in which plural printers are used as print output destinations, said apparatus comprising:
    a distribution device adapted to divide one print job into a plurality of distribution print jobs and distributing the plurality of distribution print jobs, via a virtual printer which is related with the plural printers, to the plural printers in response to input of a print start instruction by a user; and
    a display control device adapted to cause a display unit to display a situation of each of the distribution print jobs of the plural printers, the situation of each distribution print job indicating how much of the distribution print job has been printed,
    wherein said display control device causes a display unit to display a comprehensive job situation of the one print job, based on situations of the distribution print jobs of the plural printers used as the print output destinations, the comprehensive job situation indicating how much of the one print job has been printed.

6. An apparatus according to claim 5, wherein said display control device causes the display unit to display the comprehensive job situation and the situations of the print jobs of the plural printers so that the situations of the print jobs of the plural printers correspond to the comprehensive job situation.

7. An apparatus according to claim 5, further comprising an acquisition device adapted to acquire information including progress situations of the jobs from the plural printers through a communication line,
    wherein said display control device causes the display unit to display the comprehensive job situation of the one print job, based on the progress situation of each of the jobs acquired by said acquisition device.

8. An apparatus according to claim 5, further comprising a registering unit adapted to register plural printers selected by an operator as one virtual printer; and
    a second display control device adapted to cause a display unit to display the plural printers and the virtual printer as printers to be selected when printing is to be executed.

9. A program embodied in a computer-readable medium for achieving, by a computer, a management method for managing a printing operation in which plural printers are used as print output destinations, said method comprising:
    a distribution step of dividing one print job into a plurality of distribution print jobs and distributing the plurality of distribution print jobs, via a virtual printer which is related with the plural printers, to the plural printers in response to input of a print start instruction by a user;
    a first display control step of causing a display unit to display a situation of each of the distribution print jobs of the plural printers, the situation of each distribution print job indicating how much of the distribution print job has been printed; and
    a second display control step of causing the display unit to display a comprehensive job situation of the one print job, based on situations of the distribution print jobs of the plural printers used as the print output destinations, the comprehensive job situation indicating how much of the one print job has been printed.

10. A program according to claim 9, wherein said second display control step includes causing the display unit to display the comprehensive job situations and the situations of the print jobs of the plural printers so that the situations of the distribution print jobs of the plural printers correspond to the comprehensive job situation.

11. A program according to claim 9, wherein said management method further comprises an acquisition step of acquiring information including progress situations of the jobs from the plural printers through a communication line, and said second display control step includes causing the display unit to display the comprehensive job situation of the one print job, based on the progress situation of each of the jobs acquired in said acquisition step.

12. A program according to claim 9, wherein said management method further comprises:

a registering step of registering plural printers selected by an operator as one virtual printer; and a display step of displaying the plural printers and the virtual printer as printers to be selected when printing is to be executed.

\* \* \* \* \*